United States Patent
Chang et al.

(10) Patent No.: US 7,366,706 B2
(45) Date of Patent: Apr. 29, 2008

(54) METHOD AND APPARATUS FOR SOLUTION-TEMPLATE BASED DEPLOYMENT AND MANAGEMENT OF AN INTEGRATION SOLUTION

(75) Inventors: Hung-yang (Henry) Chang, Scarsdale, NY (US); Ying Huang, Yorktown Heights, NY (US); Jim Alain Laredo, Katonah, NY (US); Jeaha Yang, Stamford, CT (US); Ray Ming Yeh, Katonah, NY (US)

(73) Assignee: International Business Machines Corporation, Armonk, NY (US)

( * ) Notice: Subject to any disclaimer, the term of this patent is extended or adjusted under 35 U.S.C. 154(b) by 349 days.

(21) Appl. No.: 10/994,248

(22) Filed: Nov. 23, 2004

(65) Prior Publication Data

US 2006/0112383 A1    May 25, 2006

(51) Int. Cl.
*G06F 17/00*   (2006.01)
*G06N 5/00*   (2006.01)
(52) U.S. Cl. ............... 706/45; 706/46; 706/47
(58) Field of Classification Search ............ 706/45, 706/46, 47; 709/223; 717/174, 176
See application file for complete search history.

(56) References Cited

U.S. PATENT DOCUMENTS

| | | | |
|---|---|---|---|
| 6,336,138 B1 * | 1/2002 | Caswell et al. | 709/223 |
| 6,523,166 B1 * | 2/2003 | Mishra et al. | 717/174 |
| 6,754,896 B2 * | 6/2004 | Mishra et al. | 717/176 |
| 6,985,939 B2 * | 1/2006 | Fletcher et al. | 709/223 |

\* cited by examiner

*Primary Examiner*—Joseph P Hirl
(74) *Attorney, Agent, or Firm*—Whitham, Curtis, Christofferson & Cook, PC; Stephen C. Kaufman

(57) ABSTRACT

A method for automating the deployment and lifecycle management of an integration solution by using a deployment solution template to gather deployment information, where the integration solution combines components developed separately or on different platforms. The deployment information gathered includes the computing environment topology into which the integration solution is being deployed, as well as the resource requirements and non-functional requirements of the integration solution and its components. The method provides computer implemented models for analyzing the gathered deployment information, and identifying and optimizing deployment options. Choices for selection among identified and optimized options based on non-functional requirements of the integration solution may be displayed to a user of the deployment method. The deployment template may be customized to modify the information being gathered in view of the analysis provided by the models, and in order to use the template and models in subsequent deployments and for the management of the integration solution.

7 Claims, 2 Drawing Sheets

METHOD AND APPARATUS FOR SOLUTION-TEMPLATE BASED DEPLOYMENT AND MANAGEMENT OF AN INTEGRATION SOLUTION

CROSS REFERENCE TO RELATED APPLICATIONS

This application is related to U.S. patent application Ser. No. 10/682,800 filed Oct. 10, 2003 entitled "SYSTEM AND METHOD FOR GENERATING A BUSINESS PROCESS INTEGRATION AND MANAGEMENT (BPIM) SOLUTION", which is commonly assigned with the present application and is incorporated herein by reference.

BACKGROUND OF THE INVENTION

1. Field of the Invention

The present invention generally relates to a system and method of deployment and management of an integration solution and, in particular, to use of platform independent solution-template techniques for deployment and management of an integration solution.

2. Background Description

Once developed, an integration solution must be deployed and managed. However, current approaches to deployment tend to be fragmented around the various components of the solution. Development tools provide integrated deployment and management capabilities within the tool, but a typical integration solution contains components developed separately or from different tools. Consequently, the tool-based integrated deployment and management capabilities do not have an overall view of the solution for all participating components and their relationships, and fail to capture deployment requirements prior to the deployment. Current management tools understand individual components, and can be taught about the dependencies amongst them, but lack the notion of an overall solution. The process of transferring the knowledge about deployment and management to a suitable management tool, so that the tool will have the details of the integration solution, is labor intensive and requires special skill. Therefore, the integration solution can't be effectively and efficiently deployed. Furthermore, effective and efficient deployment of an integration solution involving components developed separately or from different tools cannot be accomplished unless the deployment process can be executed by non-experts.

SUMMARY OF THE INVENTION

It is therefore an object of the present invention to provide an automated methodology for capturing knowledge about the details of deployment and management from the viewpoint of an overall integration solution.

A further object of the invention is to provide a solution-template based methodology for using the captured details of deployment and management of an integration solution to enable efficient and effective deployment.

Another object of the invention is to provide deployment solution templates developed by experts, so that non-experts can implement the deployment of integration solutions.

An aspect of the invention is a a method for automating the deployment and lifecycle management of an integration solution. The method uses a deployment solution template to gather information for deployment of the integration solution. This deployment information captures the computing environment topology into which the integration solution is being deployed and the resource requirements and non-functional requirements of the integration solution and its components. The method then automatically matches the components of the integration solution to the environment topology, the deployment solution template having been designed so that the captured deployment information is sufficient to enable said automatic matching.

The present invention extends the solution template concept of related U.S. patent application Ser. No. 10/682,800 to support the deployment and management of the integration solution. For the purposes of deployment, however, the template concept can be applied to an integration solution even where the template concept was not used in developing the integration solution itself. Whether or not the integration solution was developed using the template concept, the integration solution will be comprised of components. Under the solution template concept, as applied to deployment, the component definitions, platform requirements and performance characteristics of each component of the integration solution are gathered. Once the physical (i.e. environment) topology available to the user is provided (through automated discovery or otherwise), the deployment solution template can then be augmented to provide a deployment layout that matches the deployment requirements. The solution template can be enriched with component specific information to fine tune the deployment automation of each component, i.e. specific information can be provided about the configuration settings and performance parameters of each component. The deployment solution template provides a structure for gathering this information, thereby providing a framework and supporting data for automated analysis of deployment options, presentation of choices to users, and using responses to these user choices to refine automation of the deployment.

For example, a new version of an integration solution may provide additional capabilities for a particular component, requiring either that certain servers, being used for that component in the current deployment, be upgraded or that the component be moved to another server. These deployment options can be identified by automated analysis and presented to the user, with the answers of the user being used to automate the deployment. Through this mechanism, users who are not experts in deployment of an integration solution are able to manage the deployment.

The augmented solution template reflects the knowledge and experience of experts, and provides a place to put the information identified by those experts as being necessary or helpful in order to deploy and manage the integration solution. Sufficient information is gathered in this process to successfully manage the deployment from the point of view of the overall integration solution. The structure of the augmented solution template enables automated analysis, based on the information gathered and structured in accordance with the template, so that the deployment process can be optimized.

By extending the solution template concept to cover deployment, the solution template becomes the unifying artifact throughout the life cycle of the integration solution. The deployment solution template provides a comprehensive and systematic structure for recording all the information required to automate the deployment. It should be emphasized that the deployment solution template serves as a unifying artifact whether or not the solution template concept was used to develop the integration solution. This unifying artifact provides a structure for information usable for automated analysis of deployment options. Furthermore, this automation approach enables optimization of available IT resources based upon the requirements and performance characteristics of the deployment solution.

Also, as the template is enriched during deployment, the added information can be provided to the management phase, thereby allowing the management tools to provide a complete view of the integration solution. Solution upgrades can reuse this information, expediting the process of deployment for newer versions of the integration solution. In addition, the information collected for one deployment can be applied the next time around to a different configuration with similar requirements.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
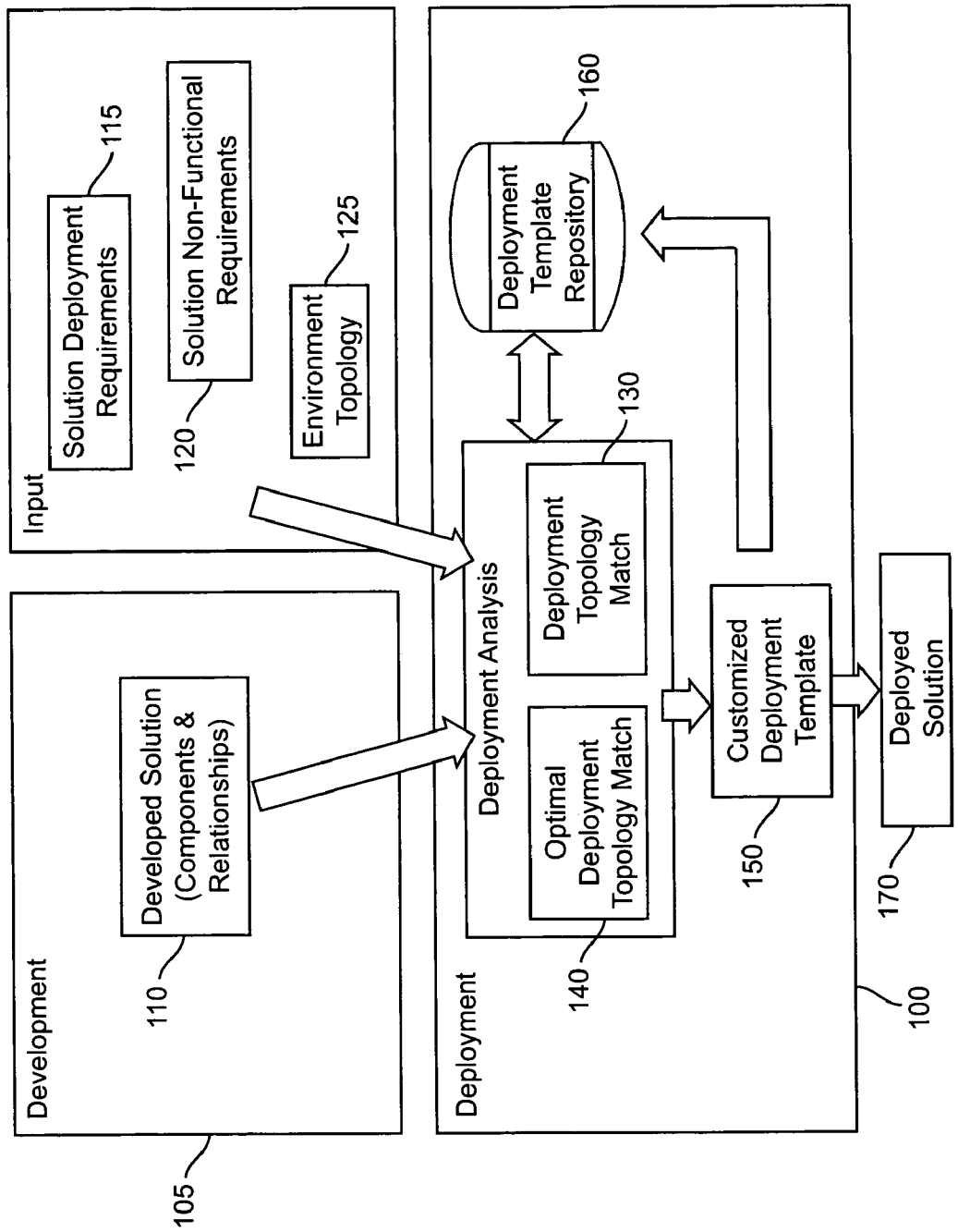
FIG. 1 is a diagram showing a deployment methodology in accordance with the invention.

Referring now to the drawings, and more particularly to FIG. 1, there is shown a methodology for implementation of the invention. The invention assumes development 105 of an integration solution 110 comprised of components separately developed, often using different tools. The integration solution 110 will provide descriptive information about the components and their inter-relationships within the solution, including component definitions. There will also be developed solution deployment requirements 115 (such as the resource requirements of each component and platform requirements), and solution non-functional requirements 120 (such as performance characteristics). This information will be entered into an appropriate solution deployment template 160. The solution deployment template 160 is a structure reflecting the expertise of those experienced in deployment, and may therefore require, for example, particular details of information regarding component resource requirements, such as usage patterns over time as well as data storage requirements, depending upon the nature of the integration solution application.

The organization and structure of these particulars may vary with the size and complexity of the integration solution 110, the particulars of solution deployment requirements 115 and non-functional requirements 120, and the environment topology 125 of the computing resources on which the integration solution is to be deployed. Consequently, it may be appropriate to develop a variety of deployment templates 160.

The invention is implemented through a deployment process 100 (further detailed in a metamodel described in FIG. 2) using solution deployment templates 160 to capture deployment requirements 115 and non-functional requirements 120 for deploying the integration solution 110, and for describing the environment topology 125 where the integration solution 110 would be deployed and subsequently executed and managed. The deployment process 100 provides for matching 130 the integration solution 110 to the environment topology 125 and, optionally, provides an algorithm 140 for optimizing usage of available IT resources (identified in the environment topology 125) based on the solution deployment requirements 115 and the solution non-functional requirements 120. The deployment template 160 selected and used in this process may be customized 150, and is then used to implement the deployed solution 170. In addition, these customized solution deployment templates 150 can be stored in the deployment template repository 160 for later use.

Figure 2:
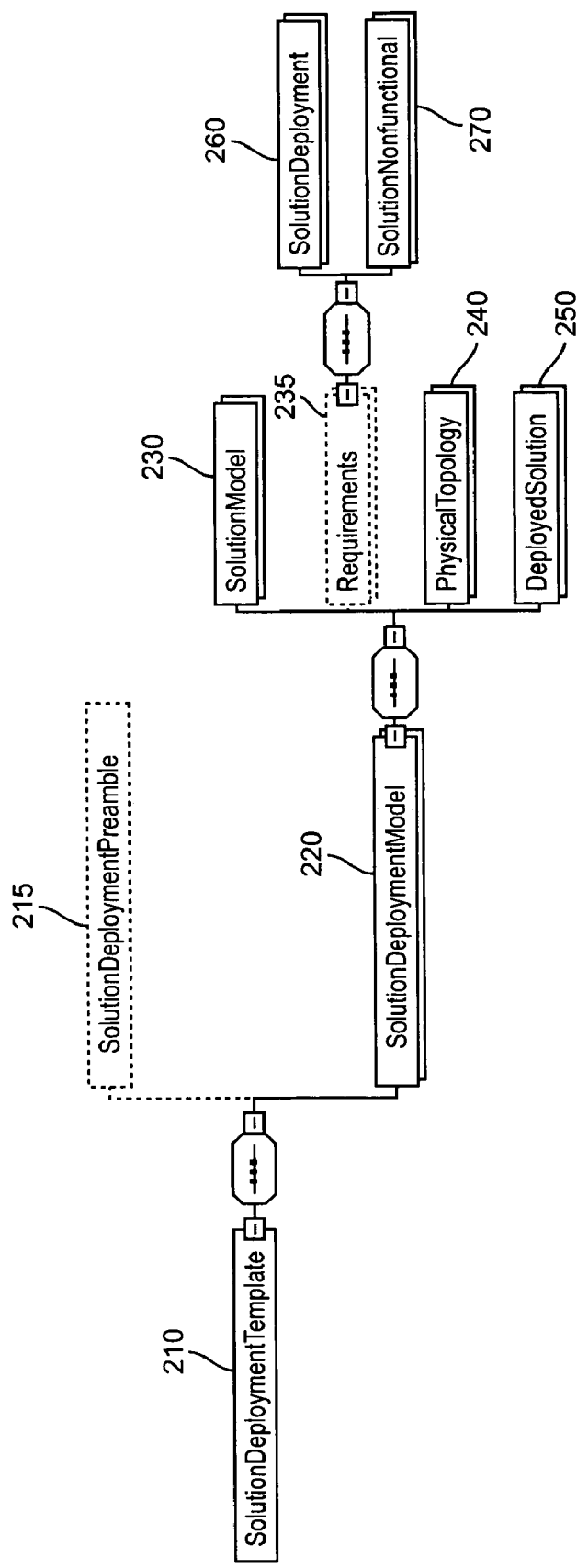
FIG. 2 is a diagram showing an XML schema for a solution deployment template.

FIG. 2 shows an XML solution deployment template schema 210 for structuring the deployment templates 160. The schema 210 contains a preamble 215 and a solution deployment model 220, which includes a model 230 of the integration solution 110, a model 240 of the deployment topology 125, and a model 250 of the deployed solution 170. Within a requirements section 235 there are models 260 and 270, respectively, of solution deployment requirements 115 and non-functional requirements 120.

Returning again to FIG. 1, the optimal matching algorithm 140 may be responsive to a variety of objectives. For example, the objective may be to deploy the integration solution 110 on a minimum number of servers. Or, alternatively, the objective may be to achieve the fastest performance of integration solution 110. The information required to execute an optimizing algorithm is gathered by using a selected one of the solution deployment templates in the repository 160. This information will include the resource constraints applicable to the servers identified in the available deployment topology 125 as well as the resource constraints applicable to the components of the integration solution 110. For example, for variables $X_{ij}$=0 or 1, where 1 indicates component i of integration solution 110 is being deployed on server j, 0 otherwise, the algorithm $$\sum_{j=1}^{n} X_{aj} = 1$$

indicates that component a should be deployed on one and only one server.

While the invention has been described in terms of a single preferred embodiment, those skilled in the art will recognize that the invention can be practiced with modification within the spirit and scope of the appended claims.

The invention claimed is:

1. A method for automating the deployment and lifecycle management of an integration solution, comprising the steps of:

using a deployment solution template to gather information for deployment of the integration solution, the deployment information capturing the computing environment topology into which the integration solution is being deployed and the resource requirements and non-functional requirements of the integration solution and its components;

automatically matching the components of the integration solution to the environment topology so as to customize the deployment solution template, the deployment solution template having been designed so that the captured deployment information is sufficient to enable said automatic matching, wherein said matching includes automatically identifying a plurality of options for said matching, and applying an optimization algorithm for selection of one of said options, wherein said optimization algorithm optimizes the use of computing resources identified in said environment topology wherein said optimization algorithm minimizes the number of servers used; and using the customized solution template for deployment of the integration solution.

2. The method of claim 1, wherein said optimization algorithm applies a resource constraint of said integration solution.

3. The method of claim 2, wherein said optimization algorithm maximizes speed of execution of said integration solution.

4. The method of claim 1, further comprising the step of further customizing the solution deployment template by modifying said gathered deployment information.

5. The method of claim 1, further comprising the step of customizing the solution deployment template to modify said deployment information in view of application of said optimization algorithm.

6. The method of claim 4, further comprising the step of adding the customized solution deployment template to a repository of solution deployment templates.

7. The method of claim 5, further comprising managing the integration solution using said customized solution deployment template.

* * * * *